(12) United States Patent
Kudo

(10) Patent No.: US 10,451,956 B2
(45) Date of Patent: Oct. 22, 2019

(54) LENS DRIVING DEVICE, CAMERA MODULE, AND CAMERA-EQUIPPED DEVICE

(71) Applicant: Shota Kudo, Tokyo (JP)

(72) Inventor: Shota Kudo, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 21 days.

(21) Appl. No.: 15/539,409

(22) PCT Filed: Dec. 24, 2015

(86) PCT No.: PCT/JP2015/006427
§ 371 (c)(1),
(2) Date: Jun. 23, 2017

(87) PCT Pub. No.: WO2016/103701
PCT Pub. Date: Jun. 30, 2016

(65) Prior Publication Data
US 2017/0351158 A1    Dec. 7, 2017

(30) Foreign Application Priority Data
Dec. 26, 2014  (JP) ................................ 2014-265990

(51) Int. Cl.
*G02B 7/02* (2006.01)
*G03B 5/04* (2006.01)
(Continued)

(52) U.S. Cl.
CPC ................. *G03B 5/04* (2013.01); *G02B 7/02* (2013.01); *G02B 7/04* (2013.01); *G02B 7/08* (2013.01);
(Continued)

(58) Field of Classification Search
CPC . G02B 7/00; G02B 7/02; G02B 7/023; G02B 7/04; G02B 7/09; G02B 27/64;
(Continued)

(56) References Cited

U.S. PATENT DOCUMENTS 8,558,419 B2 * 10/2013 Lee ..................... H02K 41/0356
310/12.16
2008/0142917 A1 * 6/2008 Lee ................... H01L 27/14618
257/432
(Continued)

FOREIGN PATENT DOCUMENTS

CN    102879973 A    1/2013
CN    102036001 B    8/2013
(Continued)

OTHER PUBLICATIONS

International Search Report from International Application No. PCT/JP2015/006427 dated Apr. 5, 2016.
(Continued)

*Primary Examiner* — Thong Q Nguyen
(74) *Attorney, Agent, or Firm* — Brundidge & Stanger, P.C.

(57) ABSTRACT

A lens driving device is provided with: a driving part including a movable part and a fixing part, a base member having a rectangular shape in plan view, wherein a shield cover is attached at a peripheral portion of the base member, and a side surface of the peripheral portion and a lower inner peripheral surface of the shield cover are bonded to each other, and a ground terminal part disposed in the base member. The base member includes at a first side of the peripheral portion a plurality of terminal housing parts recessed from the side surface. The ground terminal part includes a first ground terminal part integrally attached to the first side, and the first ground terminal part includes a plurality of ground terminals having different lengths, the (Continued)

ground terminals being respectively disposed in the plurality of terminal housing parts to be separated from the side surface.

6 Claims, 9 Drawing Sheets

(51) Int. Cl.
| | | |
|---|---|---|
| *G02B 7/04* | (2006.01) | |
| *G03B 5/00* | (2006.01) | |
| *G03B 17/02* | (2006.01) | |
| *G02B 7/09* | (2006.01) | |
| *G02B 27/64* | (2006.01) | |
| *G03B 13/36* | (2006.01) | |
| *H02K 41/035* | (2006.01) | |
| *G02B 7/08* | (2006.01) | |

(52) U.S. Cl.
CPC .............. *G02B 7/09* (2013.01); *G02B 27/646* (2013.01); *G03B 5/00* (2013.01); *G03B 13/36* (2013.01); *G03B 17/02* (2013.01); *H02K 41/0356* (2013.01); *G03B 2205/0015* (2013.01); *G03B 2205/0069* (2013.01)

(58) Field of Classification Search
CPC .......... G02B 27/646; G02B 7/08; G03B 5/00; G03B 5/04; G03B 13/36; G03B 17/02
See application file for complete search history.

(56) References Cited

U.S. PATENT DOCUMENTS

| | | | |
|---|---|---|---|
| 2009/0051774 A1* | 2/2009 | Shiraishi .............. | H04N 5/2251 348/207.99 |
| 2010/0060994 A1* | 3/2010 | Akabane ................... | G02B 7/08 359/696 |
| 2010/0061712 A1* | 3/2010 | Akabane ................... | G02B 7/08 396/439 |
| 2011/0080515 A1 | 4/2011 | Kang | |
| 2011/0293264 A1 | 12/2011 | Sato et al. | |
| 2012/0050895 A1* | 3/2012 | Kotanagi ................ | G02B 7/025 359/823 |
| 2012/0120513 A1* | 5/2012 | Kotanagi ................ | F03G 7/065 359/824 |
| 2013/0016427 A1 | 1/2013 | Sugawara | |
| 2014/0177056 A1 | 6/2014 | Hayashi et al. | |

FOREIGN PATENT DOCUMENTS

| | | |
|---|---|---|
| JP | 2012-015995 A | 1/2012 |
| JP | 2013-029821 A | 2/2013 |
| JP | 2013-210550 A | 10/2013 |
| JP | 2014-126668 A | 7/2014 |
| JP | 2014-160196 A | 9/2014 |
| WO | 2014/049963 A1 | 4/2014 |
| WO | 2014/178260 A1 | 11/2014 |

OTHER PUBLICATIONS

Extended European Search Report issued in EP 15872272.8 dated Jul. 24, 2018.

* cited by examiner

LENS DRIVING DEVICE, CAMERA MODULE, AND CAMERA-EQUIPPED DEVICE

TECHNICAL FIELD

The present invention relates to a lens driving device for auto focus or shake correction, a camera module having an auto-focusing function or a shake-correcting function, and a camera mounting device.

BACKGROUND ART

In general, a small-sized camera module is mounted in a mobile terminal such as a smartphone. In such a camera module, a lens driving device (for example, PTL 1) is employed. The lens driving device has an auto-focusing function of automatically performing focusing for capturing a subject (hereinafter referred to as "AF (Auto Focus) function"), and a shake-correcting function (hereinafter referred to as "OIS (Optical Image Stabilization) function") of correcting shake (vibration) upon capturing an image to reduce the irregularities of the image.

The auto-focusing and shake-correcting lens driving device includes an auto-focusing driving part (hereinafter referred to as "AF driving part") for moving the lens part in the light axis direction, and a shake-correcting driving part (hereinafter referred to as "OIS driving part") for swaying the lens part in a plane orthogonal to the light axis direction.

The AF driving part includes, for example, an auto-focusing coil part (hereinafter referred to as "AF coil part") disposed around the lens part, and an auto-focusing magnet part (hereinafter referred to as "AF magnet part") disposed separately from the AF coil part in the radial direction. Automatic focusing is performed by moving an AF movable part including the lens part and the AF coil part with respect to an AF fixing part including the AF magnet part in the light axis direction with use of a driving force of a voice coil motor composed of the AF coil part and the AF magnet part, for example.

Here, a lens position for bringing a subject at a smallest capture distance (a position on the most light reception side) into focus is called "macro position," and a lens position for bringing a subject at the infinity (a position on the most imaging side) into focus is called "infinity position." That is, the range from the macro position to the infinity position is the movable range of the AF movable part.

The OIS driving part includes a shake-correcting magnet part (hereinafter referred to as "OIS magnet part") disposed at the AF driving part, and a shake-correcting coil part (hereinafter referred to as "OIS coil part") disposed separately from the OIS magnet part in the light axis direction, for example. A shake correction movable part (hereinafter referred to as "OIS movable part") including the AF driving part and the OIS magnet part is supported by a supporting member so as to be separated from a shake-correcting fixing part (hereinafter referred to as "OIS fixing part") including the OIS coil part in the light axis direction. The OIS movable part is swayed in a plane orthogonal to the light axis direction by use of a driving force of a voice coil motor composed of the OIS magnet part and the OIS coil part, and thus shake correction is performed (so-called barrel shift system). The OIS magnet part can also serve as the AF magnet part, and with such a configuration, the size and the height of the lens driving device can be reduced.

The lens part is attached to the lens driving device including the AF driving part or the OIS driving part, and these parts are housed in a cover, thereby assembling a camera module. In addition, preferably, the cover is composed of a conductive material, and grounded in view of preventing generation of noise (so-called shield cover). For example, in the case where a lower inner peripheral surface of the cover is brought into contact with and bonded to a side surface of a peripheral portion of the base member serving as a part of the OIS fixing part, the cover and the ground terminal can be electrically connected with each other by disposing the ground terminal along the side surface of the peripheral portion of the base member.

In the case where the cover is grounded with the above-described structure, the base member and the cover are attached to each other, and thereafter an adhesive agent is supplied to the contact surface between the base member and the cover. In the case where the attachment position of the ground terminal is shifted with an attaching tolerance, the adhesive agent advances to the contact surface between the cover and the ground terminal in some situation. In this case, the cover and the ground terminal are partially insulated, and consequently conduction failure may possibly occur with impact of dropping or the like.

CITATION LIST

Patent Literature

PTL 1
Japanese Patent Application Laid-Open No. 2013-210550

SUMMARY OF INVENTION

Technical Problem

An object of the present invention is to provide a lens driving device having high reliability which can ensure the conduction state between the shield cover and the ground terminal even in the case where the attachment position of the ground terminal is shifted with an attaching tolerance, and a camera module and a camera mounting device including the lens driving device.

Solution to Problem

A lens driving device according to an embodiment of the present invention includes: a driving part including a movable part where a lens part is disposed and a fixing part where the movable part is fixed; a base member having a rectangular shape in plan view, wherein a shield cover is attached at a peripheral portion of the base member, and a side surface of the peripheral portion and a lower inner peripheral surface of the shield cover are bonded to each other with an adhesive agent; and a ground terminal part disposed in the base member and configured to be electrically connected with the shield cover, wherein: the base member includes at a first side of the peripheral portion a plurality of terminal housing parts recessed from the side surface, the ground terminal part includes a first ground terminal part integrally attached to the first side, and the first ground terminal part includes a plurality of ground terminals having different lengths, the ground terminals being respectively disposed in the plurality of terminal housing parts so as to be separated from the side surface.

A camera module according to an embodiment of the present invention includes: the above-mentioned lens driving device; a lens part mounted to the movable part; an image capturing part configured to capture a subject image imaged with the lens part; and a shield cover attached to the base member.

A camera mounting device according to an embodiment of the present invention is an information apparatus or a transport apparatus, the above-mentioned camera mounting device including the camera module.

Advantageous Effects of Invention

According to the present invention, a first ground terminal part integrally attached to a first side of the peripheral portion of the base member has a plurality of ground terminals having different lengths, and thus, even when the attachment position of one of the ground terminals is changed to a position where the conduction state with the shield cover is easily impaired with an attaching tolerance, the attachment position of the other ground terminal is held at a position where the conduction state with the shield cover can be ensured. Accordingly, even in the case where the attachment position of the ground terminal is shifted with an attaching tolerance, the conduction state between the shield cover and the ground terminal is ensured, and the reliability of lens driving device is remarkably improved.

DESCRIPTION OF EMBODIMENT

Figure 1A:
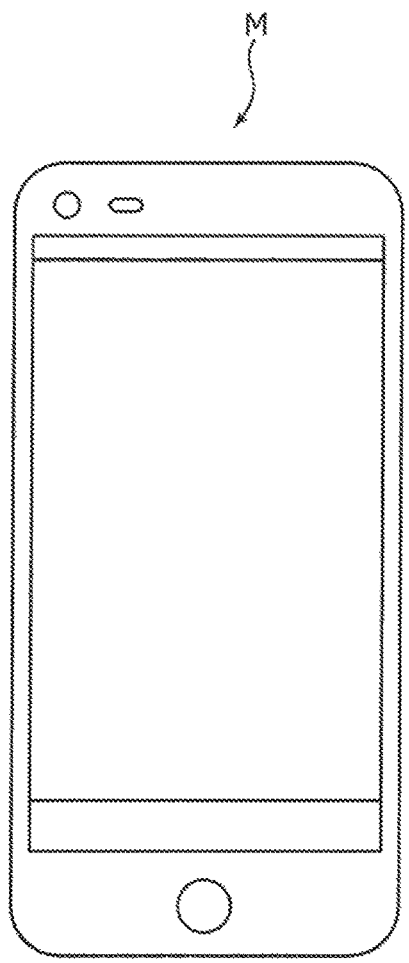
FIGS. 1A and 1B illustrate a smartphone in which a camera module according to an embodiment of the present invention is mounted.
Figure 1B:
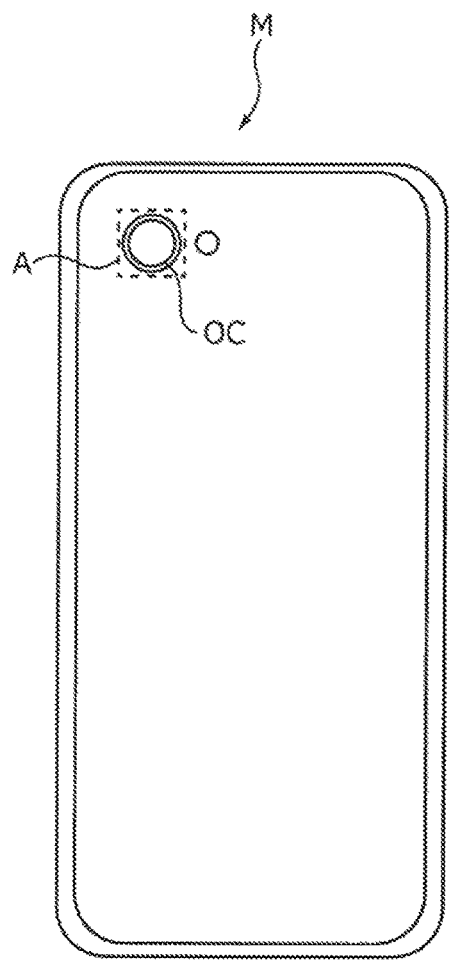

In the following, an embodiment of the present invention is described in detail with reference to the drawings. FIGS. 1A and 1B illustrate smartphone M in which camera module A according to the embodiment of the present invention is mounted. FIG. 1A is a front view of smartphone M, and FIG. 1B is a rear view of smartphone M.

For example, smartphone M is provided with camera module A as a back side camera OC. Camera module A has an auto-focusing function and a shake-correcting function, and can capture an image without image blurring by automatically performing focusing at the time of capturing a subject and by correcting shake (vibration) at the time of capturing an image.

Figure 2:
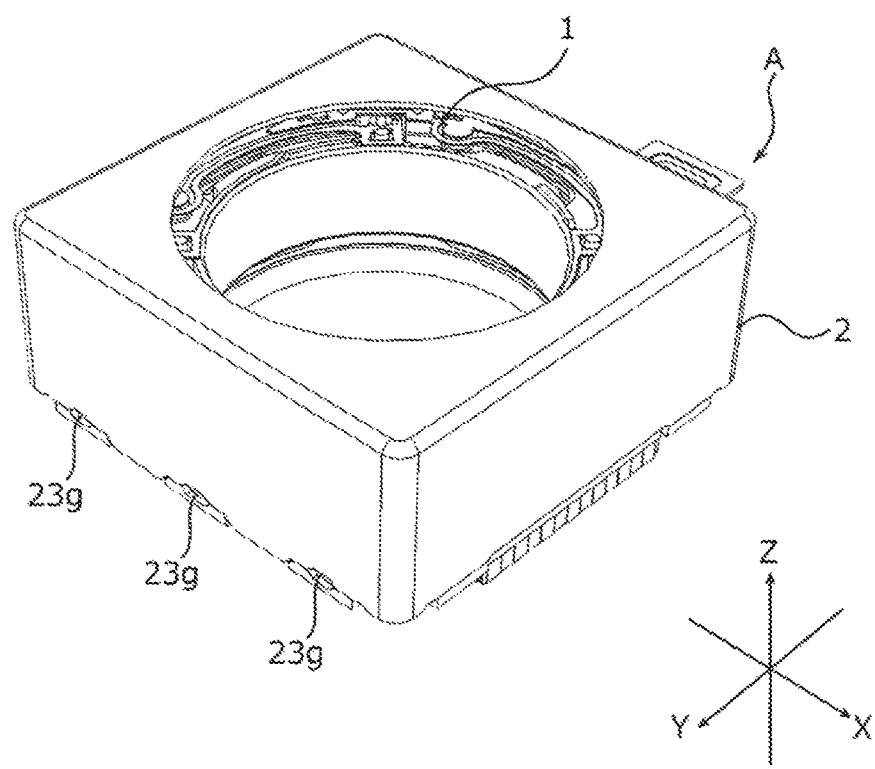
FIG. 2 is a perspective view of an external appearance of the camera module.
Figure 3:
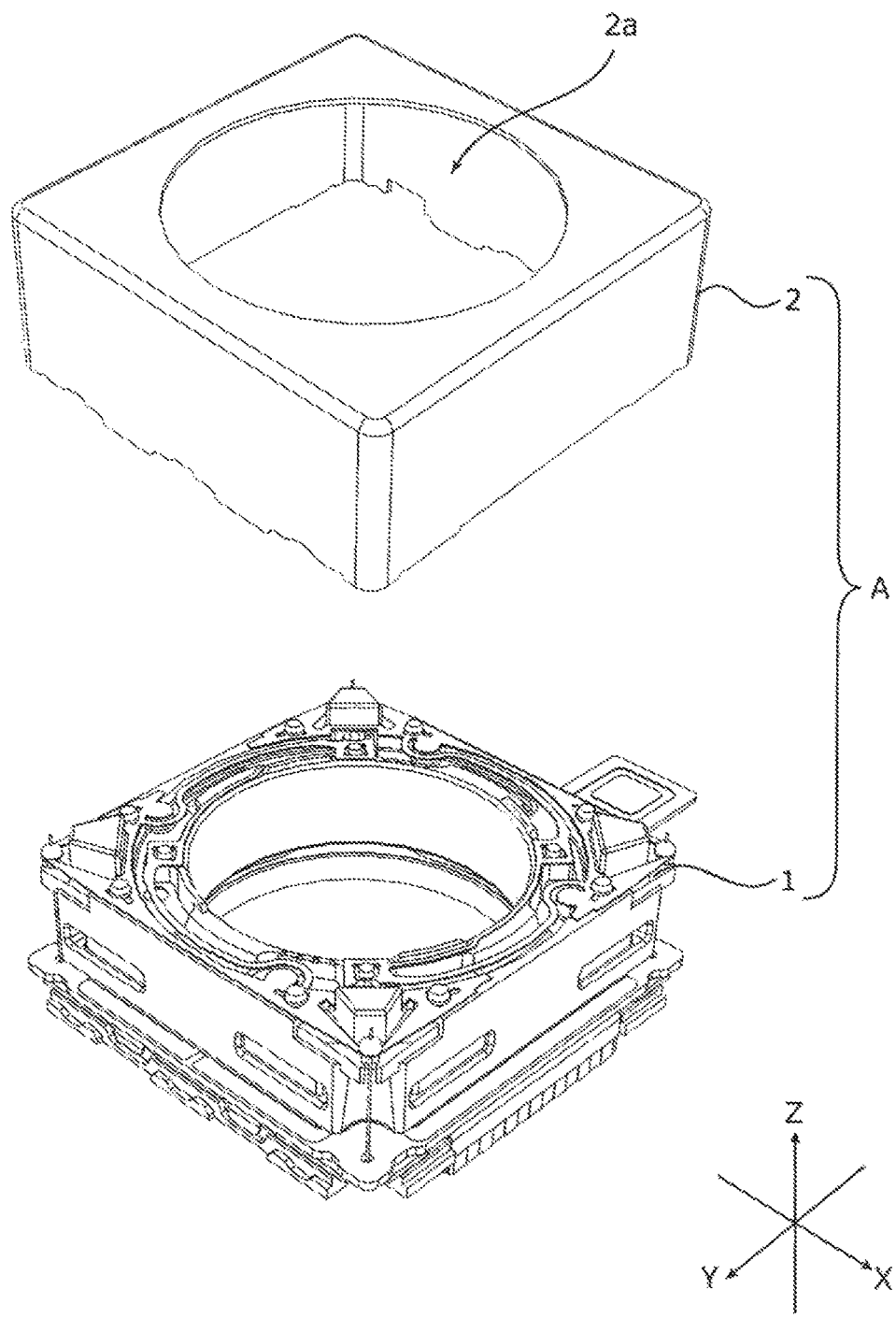
FIG. 3 is an exploded perspective view of the camera module.

FIG. 2 is a perspective view of an external appearance of camera module A. FIG. 3 is an exploded perspective view of camera module A. As illustrated in FIG. 2 and FIG. 3, descriptions will be made with an orthogonal coordinate system (X, Y, Z) in the present embodiment. Also in the drawings described later, descriptions will be made with an orthogonal coordinate system (X, Y, Z). Camera module A is mounted such that the vertical direction (or horizontal direction) is the X direction, the horizontal direction (or vertical direction) is the Y direction, and the front-rear direction is the Z direction at the time of actually capturing an image with smartphone M. That is, the Z direction is the light axis direction, the upper side in the drawing is the light reception side in the light axis direction (also referred to as "macro position side"), and the lower side is the imaging side in the light axis direction (also referred to as "infinity position side").

Camera module A includes a lens part (not illustrated) in which a lens is housed in a lens barrel having a cylindrical shape, AF and OIS lens driving device 1, an image capturing part (not illustrated) that captures a subject image imaged with the lens part, shield cover 2 that covers the entirety, and the like.

As viewed in the light axis direction, shield cover 2 is a capped square cylindrical body having a square shape in plan view. Circular opening 2a is formed in the top surface of shield cover 2. A lens part (not illustrated) is exposed to the outside through opening 2a. Shield cover 2 is fixed to base member 23 (see FIG. 6) of OIS fixing part 20 of lens driving device 1. Shield cover 2 has conductivity. Shield cover 2 is electrically connected with ground terminal parts 221 and 222 of OIS fixing part 20, and is grounded.

The image capturing part (not illustrated) includes an imaging device (not illustrated), and is disposed on the imaging side in the light axis direction of the lens driving device 1. The imaging device (not illustrated) is composed of, for example, a CCD (charge coupled device) image sensor, a CMOS (complementary metal oxide semiconductor) image sensor, or and the like. The imaging device (not illustrated) captures a subject image imaged by a lens part (not illustrated).

Figure 4:
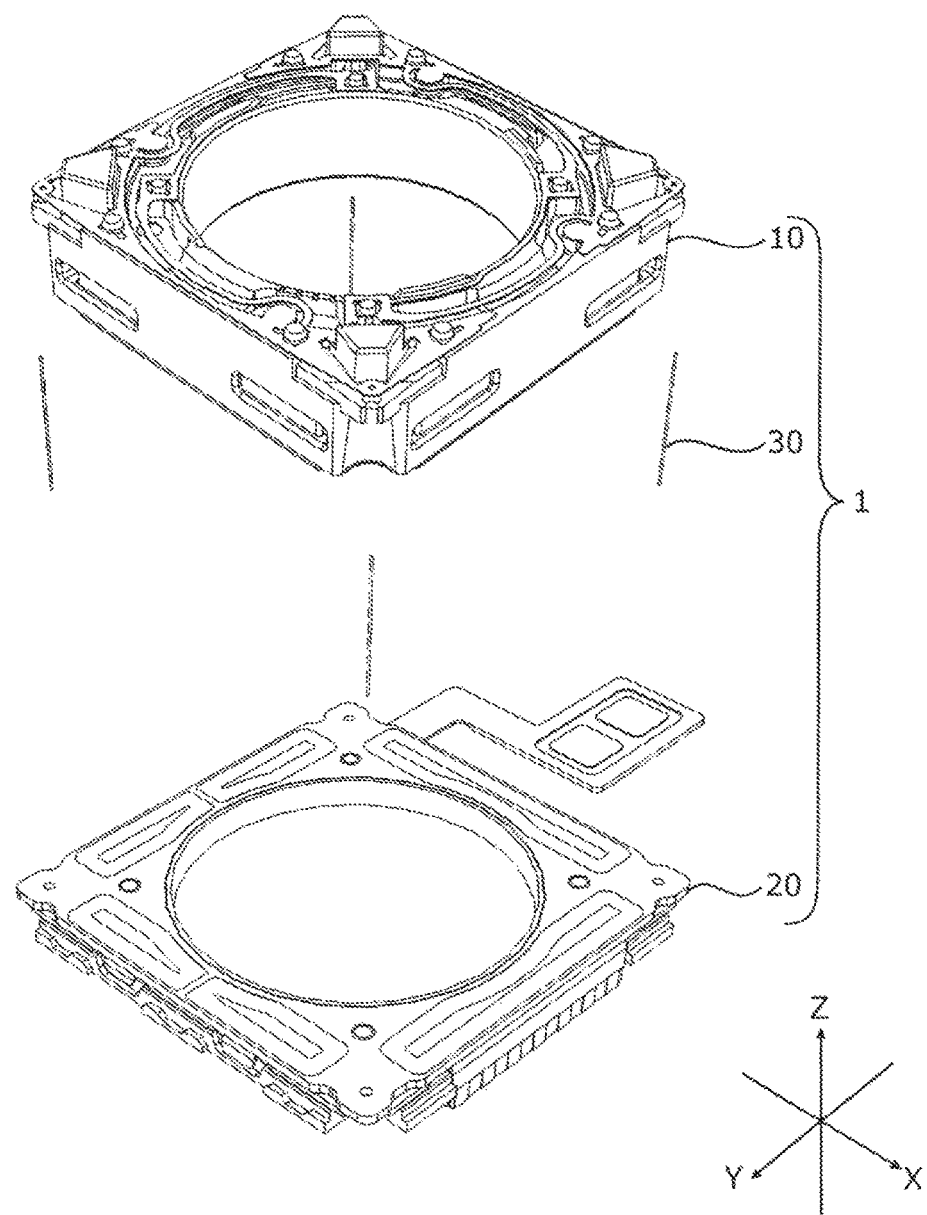
FIG. 4 is an exploded perspective view of a lens driving device.

FIG. 4 is an exploded perspective view of lens driving device 1. As illustrated in FIG. 4, lens driving device 1 includes OIS movable part 10, OIS fixing part 20, and supporting member 30.

OIS movable part 10 includes an OIS magnet part serving as a component of the OIS voice coil motor, and sways in the XY plane at the time of shake correction. OIS fixing part 20 includes an OIS coil part. OIS movable part 10 includes an AF driving part.

OIS movable part 10 is disposed on the light reception side in the light axis direction relative to OIS fixing part 20 and is separated from OIS fixing part 20. OIS movable part 10 is coupled with OIS fixing part 20 by supporting member 30. To be more specific, supporting member 30 is composed of four suspension wires extending along the Z direction (hereinafter referred to as "suspension wire 30"). One end (upper end) of suspension wire 30 is fixed to OIS movable part 10 (upper elastic supporting part 13, see FIG. 5), and the other end (lower end) of suspension wire 30 is fixed to OIS fixing part 20 (coil substrate 21, see FIG. 6). OIS movable part 10 is supported by suspension wire 30 such that OIS movable part 10 can sway in the XY plane. Two of the four suspension wires 30 are used for feeding power to AF coil part 112 (see FIG. 5). It is to be noted that the number of suspension wires 30 is not limited, and five or more suspension wires 30 may be provided.

Figure 5:
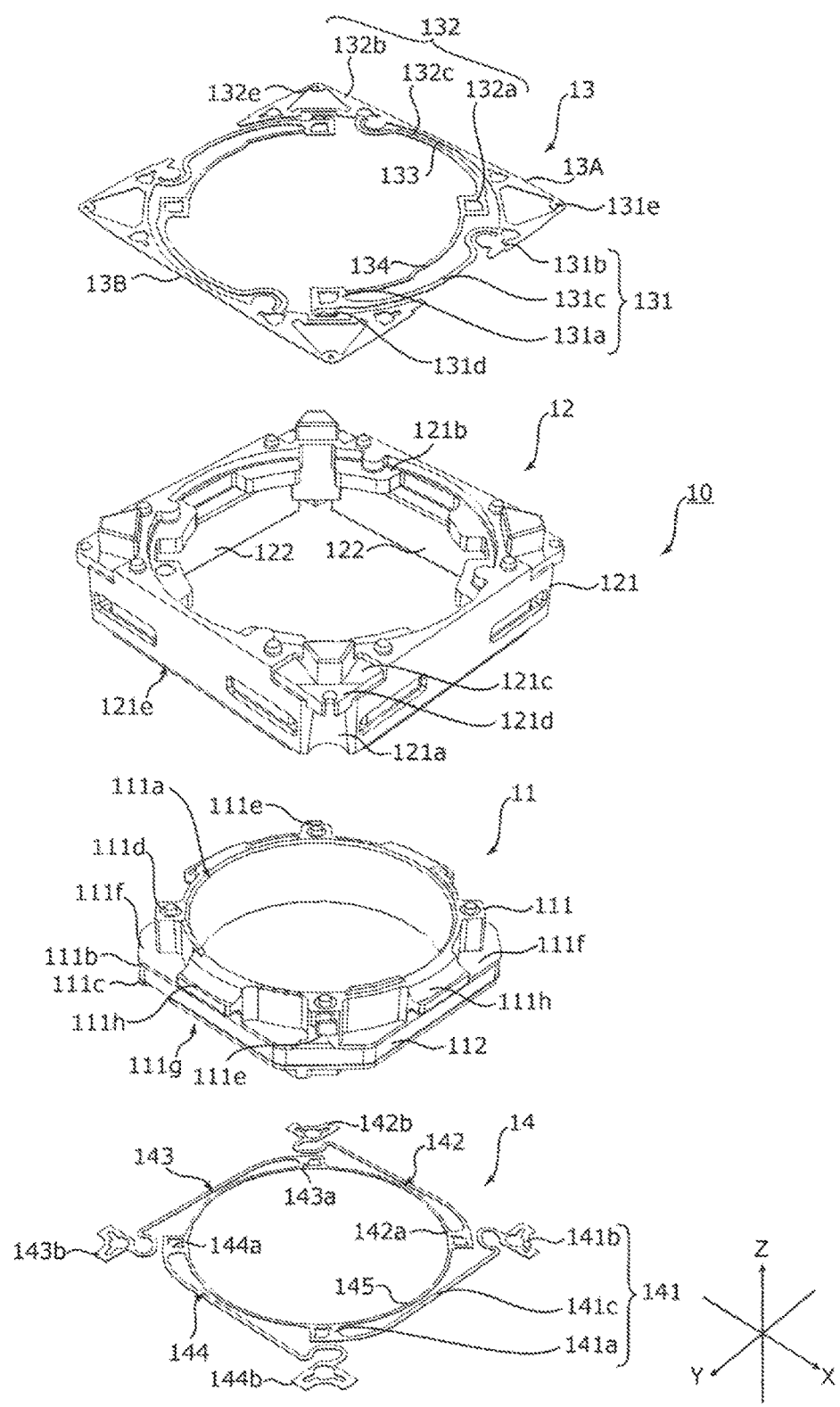
FIG. 5 is an exploded perspective view of an OIS movable part.

FIG. 5 is an exploded perspective view of OIS movable part 10. As illustrated in FIG. 5, OIS movable part 10 includes AF movable part 11, AF fixing part 12, upper elastic supporting part 13, lower elastic supporting part 14. AF movable part 11 includes an AF coil part serving as a component of an AF voice coil motor, and moves in the light axis direction at the time of focusing. AF fixing part 12 is a part having an AF magnet part. That is, the AF driving part of lens driving device 1 is of a moving coil type. AF movable part 11 is disposed on the radially inside relative to AF fixing part 12 and is separated from AF fixing part 12. AF movable part 11 is coupled with AF fixing part 12 by upper elastic supporting part 13 and lower elastic supporting part 14.

AF movable part 11 includes lens holder 111 and AF coil part 112.

Lens holder 111 is a member having a quadrangular cylindrical shape, and a lens part (not illustrated) is fixed to lens housing part 111a having a cylindrical shape by bonding or screwing. Lens holder 111 includes upper flange part 111b and lower flange part 111c on the peripheral surface of lens housing part 111a. AF coil part 112 is wound at a part (hereinafter referred to as "coil winding part") sandwiched between upper flange part 111b and lower flange part 111c.

Lens holder 111 includes, at positions corresponding to the four corners at an upper portion of the outer periphery of lens housing parts 111a, upper spring fixing part 111d for fixing upper elastic supporting part 13. Lens holder 111 includes tying parts 111e that protrude outward in a radial direction from two diagonally-opposite upper spring fixing parts 111d of four upper spring fixing parts 111d.

Top surface 111f of upper flange part 111b serves as a locking part for restricting movement of AF movable part 11 to the light reception side in the light axis direction (hereinafter referred to as "first locking part 111f"). Lower elastic supporting part 14 is fixed to bottom surface 111g of lower flange part 111c (hereinafter referred to as "lower spring fixing part 111g").

Lens holder 111 includes protruding parts 111h that protrude outward in a radial direction over upper flange part 111b and lower flange part 111c at opposite positions in the X direction and the Y direction of an upper portion of the outer periphery of lens housing part 111a. Protruding part 111h serves as a locking part for restricting movement of AF movable part 11 to the imaging side in the light axis direction (hereinafter referred to as "second locking part 111h").

AF coil part 112 is an air-core coil that is energized at the time of focusing, and is wound around the outer peripheral surface of a coil winding part of lens holder 111. The both ends of AF coil part 112 are tied to tying parts 111e of lens holder 111.

AF fixing part 12 includes magnet holder 121 and magnet part 122. While FIG. 5 illustrates a state where magnet holder 121 is attached on magnet part 122, magnet part 122 is attached after AF movable part 11 is inserted to magnet holder 121 in practice.

Magnet holder 121 has a quadrangular cylindrical shape which is square in plan view. Four connection parts (four sides extending along the Z-axis direction) connecting the side walls of magnet holder 121 are recessed to radially inside in an arc-like shape. Suspension wire 30 is disposed at this portion (hereinafter referred to as "wire insertion part 121a"). With wire insertion part 121a, interference between suspension wire 30 and magnet holder 121 at the time when OIS movable part 10 sways is avoided.

Figure 7A:
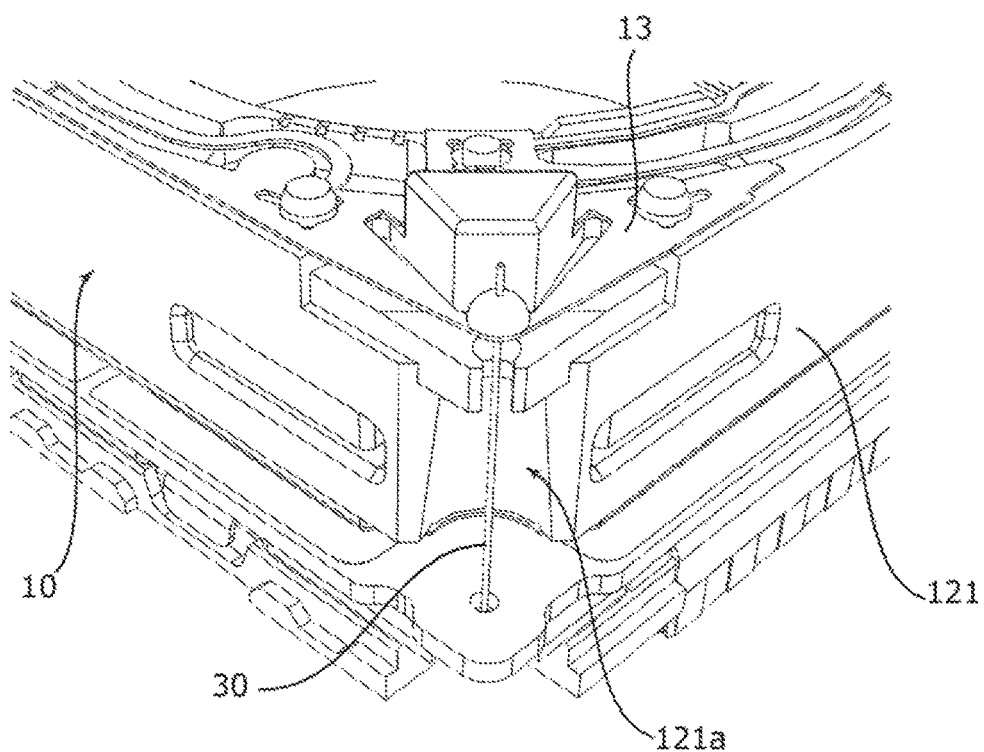
FIGS. 7A and 7B are enlarged views illustrating a wire insertion part in a magnet holder.
Figure 7B:
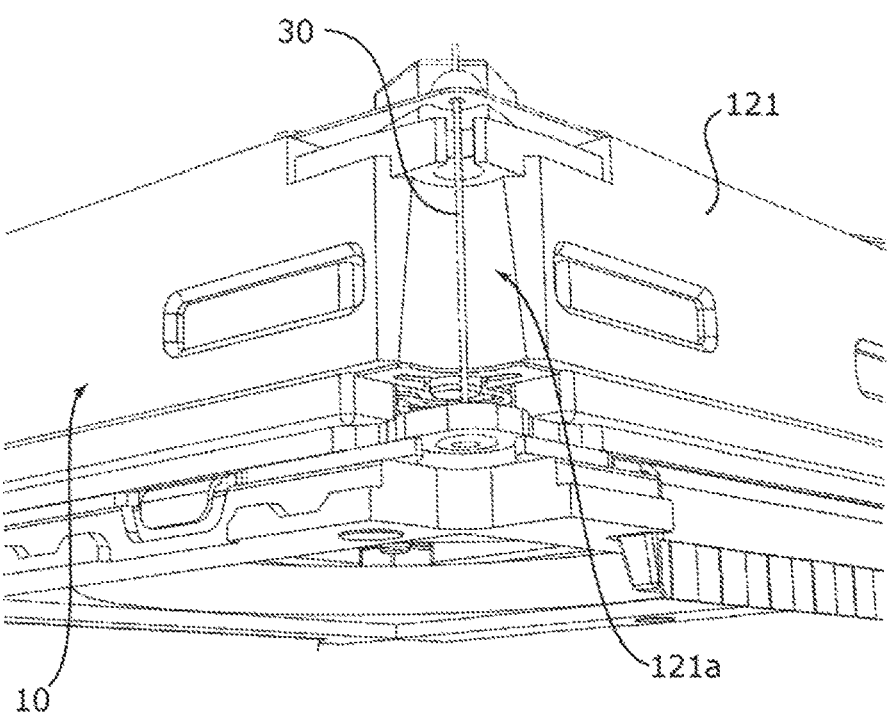

As illustrated in FIGS. 7A and 7B in an enlarged manner, the internal diameter of wire insertion part 121a is larger on the lower side than the upper side. Here, wire insertion part 121a has a truncated cone shape whose internal diameter gradually decreases from the imaging side toward the light reception side in the light axis direction.

The lower portion of suspension wire 30 is fixed to coil substrate 21, and does not follow the sway of magnet holder 121, and accordingly, the distance to magnet holder 121 thereof changes. In view of this, in wire insertion part 121a, a portion corresponding to the lower portion of suspension wire 30 is largely cut out so that magnet holder 121 and suspension wire 30 do not interfere with each other at the time when OIS movable part 10 sways.

In contrast, the upper portion of suspension wire 30 follows the sway of magnet holder 121, and therefore the distance to magnet holder 121 thereof is maintained. Accordingly, the size of the portion of wire insertion part 121a which corresponds to the upper portion of suspension wire 30 can be small. By setting the internal diameter of wire insertion part 121a such that the internal diameter of the upper portion is smaller than that of the lower portion, the mechanical strength of magnet holder 121 can be increased. Accordingly, the size of the external shape of magnet holder 121 can be set to a small value, and in turn, downsizing of lens driving device 1 can be achieved.

Magnet holder 121 includes, at the upper portion, stopper parts 121b that protrude inward in the radial direction in a ring-shape. In stopper part 121b, the portion corresponding to second locking part 111h and upper spring fixing part 111d of lens holder 111 is cut out such that AF movable part 11 can move to the light reception side in the light axis direction relative to the top surface of magnet holder 121. When AF movable part 11 moves to the light reception side in the light axis direction, stopper part 121b makes contact with first locking part 111f of lens holder 111, and thus the movement of AF movable part 11 to the light reception side in the light axis direction is restricted. In addition, arm parts 131c and 132c of upper elastic supporting part 13 are placed on the top surface of stopper part 121b. The top surface of magnet part 122 makes contact with the bottom surface of stopper part 121b.

Lower elastic supporting part 14 is fixed to bottom surface 121e of magnet holder 121 (hereinafter referred to as "lower spring fixing part 121e"). Magnet holder 121 includes, at the four corners of the upper portion, upper spring fixing parts 121c that fix upper elastic supporting part 13. The peripheral portion of the upper boss having a trapezoidal columnar shape disposed in upper spring fixing part 121c is slightly recessed from the top surface (the surface on which upper elastic supporting part 13 is attached) of magnet holder 121 such that a gap (damper installation part 121d) is formed when upper elastic supporting part 13 is attached. The corner (the portion provided continuously with the upper portion of wire insertion part 121a) of damper installation part 121d protrudes to the outside relative to the lower portion, and is cut out in an arc-like shape. The cut-out portion having an arc-like shape of damper installation part 121d forms a part of wire insertion part 121a.

Magnet part 122 includes four permanent magnets each having a cuboid shape. Magnet part 122 is disposed along the internal surface of each of the four side walls of magnet holder 121. Magnet parts 122 are magnetized such that a traversing magnetic field in the radial direction is formed at AF coil part 112. For example, magnet parts 122 are magnetized such that the inner periphery side and the outer periphery side thereof are set to N pole and S pole, respectively.

The AF voice coil motor is composed of magnet part 122 and AF coil part 112. In the present embodiment, magnet part 122 serves as the AF magnet part and as the OIS magnet part.

Upper elastic supporting part 13 is a leaf spring formed of beryllium copper, nickel copper, stainless-steel or the like, for example, and has a square shape as a whole in plan view. Upper elastic supporting part 13 elastically connects AF fixing part 12 (magnet holder 121) and AF movable part 11 (lens holder 111).

Upper elastic supporting part 13 is composed of two upper leaf springs 13A and 13B (upper elastic supporting members) which are disposed in a point-symmetrical manner about the light axis. Each of upper leaf springs 13A and 13B includes spring parts 131 and 132. Since the configurations of upper spring parts 13A and 13B are similar to each other, the description of upper leaf spring 13B is omitted.

In upper leaf spring 13A, spring part 131 includes lens holder fixing part 131a that is fixed to lens holder 111, magnet holder fixing part 131b that is disposed at a position at 90 degrees from lens holder fixing part 131a and is fixed to magnet holder 121, and arm part 131c that couples lens holder fixing part 131a and magnet holder fixing part 131b. In addition, lens holder fixing part 131a includes coil connecting part 131d that has a U-shape in plan view and is bonded by soldering to an end portion of AF coil part 112.

Likewise, spring part 132 includes lens holder fixing part 132a that is fixed to lens holder 111, magnet holder fixing part 132b that is disposed at a position at 90 degrees from lens holder fixing part 132a and is fixed to magnet holder 121, and arm part 132c that couples lens holder fixing part 132a and magnet holder fixing part 132b.

Lens holder fixing parts 131a and 132a are coupled by inner coupling part 133 at a position inside arm part 131c. In addition, magnet holder fixing parts 131b and 132b are coupled by outer coupling part 134 at a position outside arm part 132c.

Each of lens holder fixing parts 131a and 132a has a shape corresponding to upper spring fixing part 111d of lens holder 111. When the positioning bosses of lens holder 111 are fitted into the fixing holes of lens holder fixing parts 131a and 132a, upper leaf springs 13A and 13B are positioned and fixed to lens holder 111. Coil connecting part 131d is electrically connected by soldering with AF coil part 112 tied to tying part 111e of lens holder 111.

Each of magnet holder fixing parts 131b and 132b has a shape corresponding to upper spring fixing part 121c of magnet holder 121. When the positioning bosses of upper spring fixing parts 121c are fitted into the fixing holes of magnet holder fixing parts 131b and 132b, upper leaf springs 13A and 13B are positioned and fixed to magnet holder 121. In addition, each of vertex parts 131e and 132e of magnet holder fixing parts 131b and 132b serves as a wire connecting part (hereinafter referred to as "wire connecting parts 131e and 132e") where suspension wire 30 is connected.

Wire connecting parts 131e and 132e are located on the light reception side of wire insertion part 121a of magnet holder 121 in the light axis direction. In the state where upper leaf springs 13A and 13B are attached to magnet holder 121, a gap is formed between damper installation part 121d and wire connecting parts 131e and 132e. A damper is disposed in this gap. In addition, each of wire connecting parts 131e and 132e has a shape which is easily elastically deformed. With deflection of wire connecting parts 131e and 132e and suspension wire 30, drop impact is absorbed. Thus, plastic deformation and rupture of suspension wire 30 with drop impact can be effectively prevented.

Arm parts 131c and 132c couple lens holder fixing part 131a and magnet holder fixing part 131b, and lens holder fixing part 132a and magnet holder fixing part 132b, respectively. Each of arm parts 131c and 132c is formed in an arc-like shape, and is elastically deformed when AF movable part 11 moves.

As with upper elastic supporting part 13, lower elastic supporting part 14 is a leaf spring (hereinafter referred to as "lower leaf spring 14") made of beryllium copper, nickel copper, stainless-steel or the like. Lower elastic supporting part 14 elastically connects AF fixing part 12 (magnet holder 121) and AF movable part 11 (lens holder 111).

Lower leaf spring 14 (lower elastic supporting member) includes four spring parts 141 to 144. Spring part 141 includes lens holder fixing part 141a that is fixed to lens holder 111, magnet holder fixing part 141b that is disposed at a position at 90 degrees from lens holder fixing part 141a and is fixed to magnet holder 121, and arm part 141c that couples lens holder fixing part 141a and magnet holder fixing part 141b. The configurations of spring parts 142 to 144 are similar to the above-mentioned configuration.

In lens holder fixing parts 141a, 142a, 143a and 144a, the lens holder fixing parts adjacent to each other are coupled with coupling part 145 to have a shape corresponding to lower spring fixing part 111g of lens holder 111. When the positioning bosses of lens holder 111 are fitted into the fixing holes of lens holder fixing parts 141a, 142a, 143a and 144a, lower leaf spring 14 is positioned and fixed to lens holder 111.

Magnet holder fixing parts 141b, 142b, 143b and 144b have shapes corresponding to lower spring fixing part 121e of magnet holder 121. When the positioning bosses of upper spring fixing parts 121c are fitted into the fixing holes of magnet holder fixing parts 131b and 132b, upper leaf springs 13A and 13B are positioned and fixed to magnet holder 121.

At the time of assembling OIS movable part 10 (AF driving part), first, magnet holder fixing parts 131b and 132b of upper leaf springs 13A and 13B are attached to upper spring fixing part 121c of magnet holder 121. In addition, lens holder fixing parts 141a, 142a, 143a and 144a of lower leaf spring 14 are attached to lower spring fixing part 111g of lens holder 111.

Next, lens holder 111 is fitted into magnet holder 121 from the imaging side in the light axis direction. At this time, second locking part 111h and upper spring fixing part 111d of lens holder 111 are fitted to the cutout of stopper part 121b of magnet holder 121. Then, lens holder fixing parts 131a and 132a of upper leaf springs 13A and 13B are attached to upper spring fixing parts 111d of lens holder 111. Coil connecting part 131d is bonded by soldering to the both ends of AF coil part 112 tied to tying part 111e of lens holder 111, so as to be electrically connected. In addition, magnet holder fixing parts 141b, 142b, 143b and 144b of lower leaf spring 14 are attached to lower spring fixing part 121e of magnet holder 121.

Next, magnet part 122 is inserted from the imaging side in the light axis direction, and bonded to magnet holder 121. In this manner, OIS movable part 10 (AF driving part) is assembled.

Figure 6:
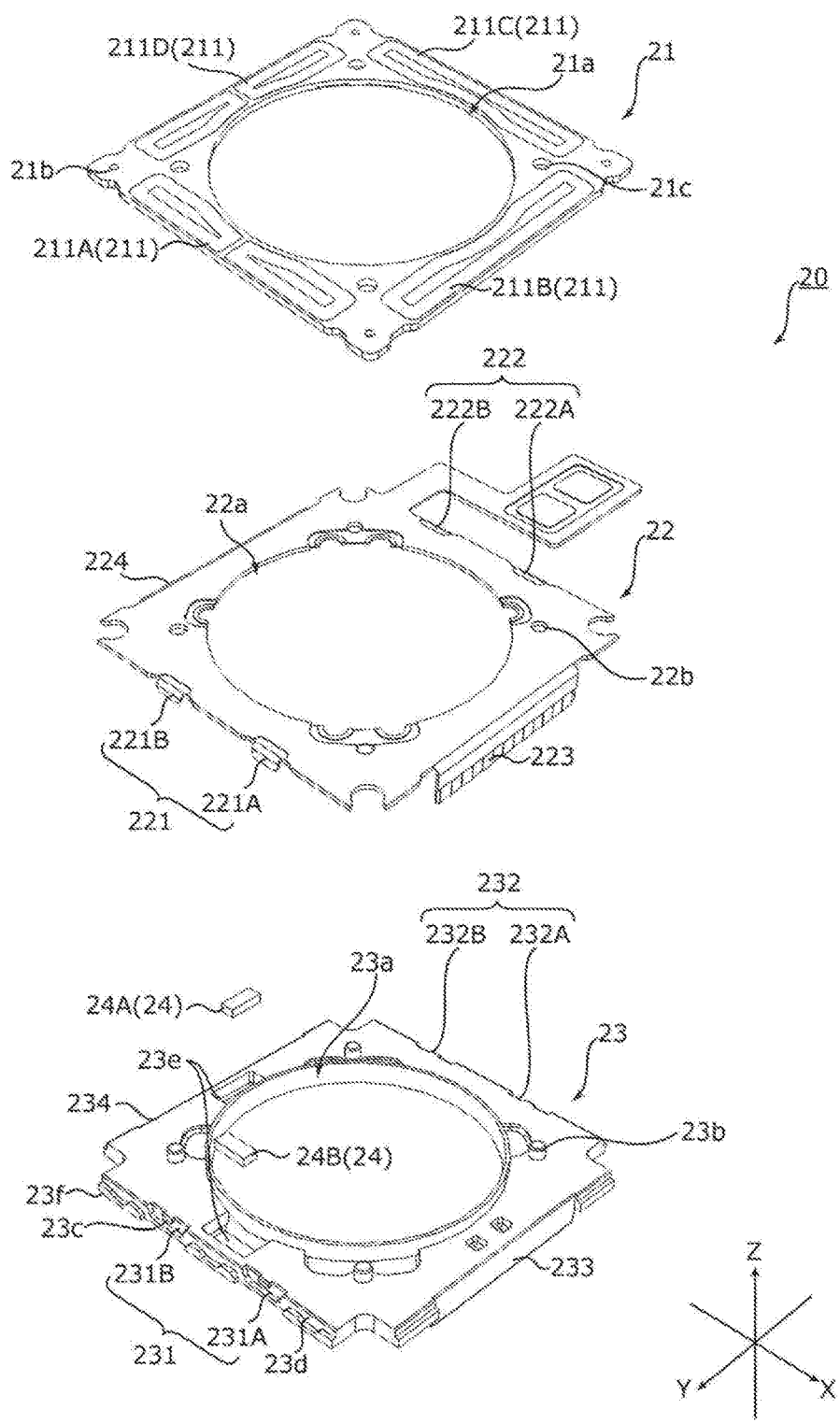
FIG. 6 is an exploded perspective view of an OIS fixing part.

FIG. 6 is an exploded perspective view of OIS fixing part 20. As illustrated in FIG. 6, OIS fixing part 20 includes coil substrate 21, sensor substrate 22, base member 23, position detection part 24 and the like.

In plan view, coil substrate 21 has a square shape, and has circular opening 21a at a center portion. Coil substrate 21 includes, at the four corners, wire fixing holes 21b through which the other end (lower end) of suspension wire 30 is inserted. In addition, coil substrate 21 includes, at positions which intersect the diagonal direction of peripheral portions of opening 21a, positioning holes 21c.

Coil substrate 21 includes OIS coil part 211 at a position opposite to magnet part 122 in the light axis direction. OIS coil part 211 includes four OIS coils 211A to 211D corresponding to magnet parts 122. The sizes and positions of OIS coil part 211 and magnet part 122 and magnet parts 122 are set such that the magnetic field radiated from the bottom surfaces of magnet parts 122 traverses the long side portions of OIS coils 211A to 211D in the Z direction. The OIS voice coil motor is composed of magnet part 122 and OIS coil part 211.

As with coil substrate 21, sensor substrate 22 has a square shape in plan view, and has circular opening 22a at a center portion. Sensor substrate 22 includes, at peripheral portions of opening 22a, positioning holes 22b at positions corresponding to positioning holes 21c of coil substrate 21. Sensor substrate 22 includes, at two sides along the Y direction, control terminal parts 223 and 224 that are bent downward. Sensor substrate 22 includes, at the two sides along the X direction (the two sides opposite to each other in the Y direction), ground terminal parts 221 and 222. Ground terminal parts 221 and 222 are electrically connected with shield cover 2.

Ground terminal part 221 is composed of ground terminals 221A and 221B having different lengths that are protruded outward and bent downward (hereinafter referred to as "first ground terminal 221A" and "second ground terminal 221B"). Likewise, ground terminal part 222 is composed of ground terminals 222A and 222B having different lengths that are protruded outward and bent downward (hereinafter referred to as "third ground terminal 222A" and "fourth ground terminal 222B"). That is, the lengths of the ground terminals in one side are different from each other.

Here, first ground terminal 221A and third ground terminal 222A have the longer length, and second ground terminal 221B and fourth ground terminal 222B have the shorter length. That is, the lengths of the ground terminals opposite to each other in the Y direction are equal to each other. It is to be noted that the lengths of the ground terminals opposite to each other in the Y direction may be different from each other.

The length of first ground terminal 221A is set such that the contact area with shield cover 2 is sufficiently ensured even when protruding length L1 of first ground terminal 221A to first ground terminal housing part 231A (see FIG. 8) is small due to the attaching tolerance of sensor substrate 22 attached to base member 23. In addition, the length is set such that first ground terminal 221A is housed in first ground terminal housing part 231A (or that first ground terminal 221A is not placed onto side surface 23d of base member 23) even when the protruding length of first ground terminal 221A to first ground terminal housing part 231A is large. The same applies to third ground terminal 222A.

The length of second ground terminal 221B is set such that the distance from the edge of base member 23 (that is, side surface 23d) is sufficiently ensured even when protruding length L2 of second ground terminal 221B to second ground terminal housing part 231B (see FIG. 8) is large due to the attaching tolerance of sensor substrate 22 attached to base member 23. In addition, the length is set such that second ground terminal 221B is exposed to second ground terminal housing part 231B even when the protruding length of second ground terminal 221B to second ground terminal housing part 231B is small. The same applies to fourth ground terminal 222B.

Sensor substrate 22 AF includes a power-source line (not illustrated) for power feeding to coil part 112 and OIS coil part 211, and a signal line (not illustrated) for a detection signal output from Hall devices 24A and 24B. Position detection part 24 that detects the position of OIS movable part 10 in the XY plane is disposed on the bottom surface of sensor substrate 22.

Position detection part 24 is composed of Hall devices 24A and 24B (magnetic sensors) that detect the magnetic field by utilizing Hall effect, for example. Hall devices 24A and 24B are respectively disposed at adjacent two sides of the bottom surface of sensor substrate 22, at an approximate center thereof. By detecting the magnetic field formed by magnet part 122 with Hall devices 24A and 24B, the position of OIS movable part 10 in the XY plane can be specified. It is to be noted that a magnet for position detection may be disposed independently of magnet part 122 in OIS movable part 10.

As with coil substrate 21, base member 23 has a square shape in plan view, and has circular opening 23a at a center portion. Base member 23 includes, at peripheral portions of opening 23a, positioning bosses 23b at positions corresponding to positioning holes 21c of coil substrate 21 and positioning holes 22b of sensor substrate 22. In addition, base member 23 includes, at peripheral portions of opening 23a, Hall device housing parts 23e at positions corresponding to Hall devices 24A and 24B.

Base member 23 includes, at positions corresponding to control terminal parts 223 and 224 of sensor substrate 22 at the two sides, extending along the Y direction respectively, of the peripheral portion, control terminal housing parts 233 and 234 which are further recessed from side surface 23d. In addition, base member 23 includes, at positions corresponding to ground terminals 221 and 222 of sensor substrate 22 at the two sides, extending along the X direction respectively, of the peripheral portion, ground terminal housing parts 231 and 232 further recessed from side surface 23d.

Ground terminal housing part 231 includes first ground terminal housing part 231A where first ground terminal 221A is disposed, and second ground terminal housing part 231B where second ground terminal 221B is disposed. Likewise, ground terminal housing part 232 includes third ground terminal housing part 232A where third ground terminal 222A is disposed, and fourth ground terminal housing part 232B where fourth ground terminal 222B is disposed.

Along protruding part 23c, first ground terminal 221A to fourth ground terminal 222B are disposed to first ground terminal housing part 231A to fourth ground terminal housing part 232B, respectively. First ground terminal 221A to fourth ground terminal 222B are separated from the reference surfaces of first ground terminal housing part 231A to fourth ground terminal housing part 232B. With this configuration, first ground terminal 221A to fourth ground terminal 222B are flush with side surface 23d of base member 23.

Base member 23 includes, in the region except for the regions of ground terminal housing parts 231 and 232 in the two sides where ground terminal housing parts 231 and 232 are provided, cover placing part 23f for placing shield cover 2. Cover placing part 23f is formed by recessing a part of the cover placing surface such that adhesive agent inlet 23g is formed when shield cover 2 is placed (see FIG. 2).

At the time of assembling OIS fixing part 20, first, coil substrate 21 and sensor substrate 22 are bonded by soldering. In this manner, the power-source line (not illustrated) of sensor substrate 22 and OIS coil part 211 are electrically connected to each other. Depending on the attaching tolerance at this time, the protruding lengths of ground terminals 221 and 222 in ground terminal housing parts 231 and 232 of base member 23 change.

Next, positioning holes 21c of coil substrate 21 and positioning holes 22b of sensor substrate 22 are fitted to positioning bosses 23b of base member 23, to dispose coil substrate 21 and sensor substrate 22 on base member 23. When ground terminal parts 221 and 222 of sensor substrate 22 are engaged with ground terminal housing parts 231 and 232 of base member 23, and control terminal parts 223 and 224 are engaged with control terminal housing parts 233 and 234, coil substrate 21 and sensor substrate 22 are fixed to base member 23. In this manner, OIS fixing part 20 is assembled.

Figure 8:
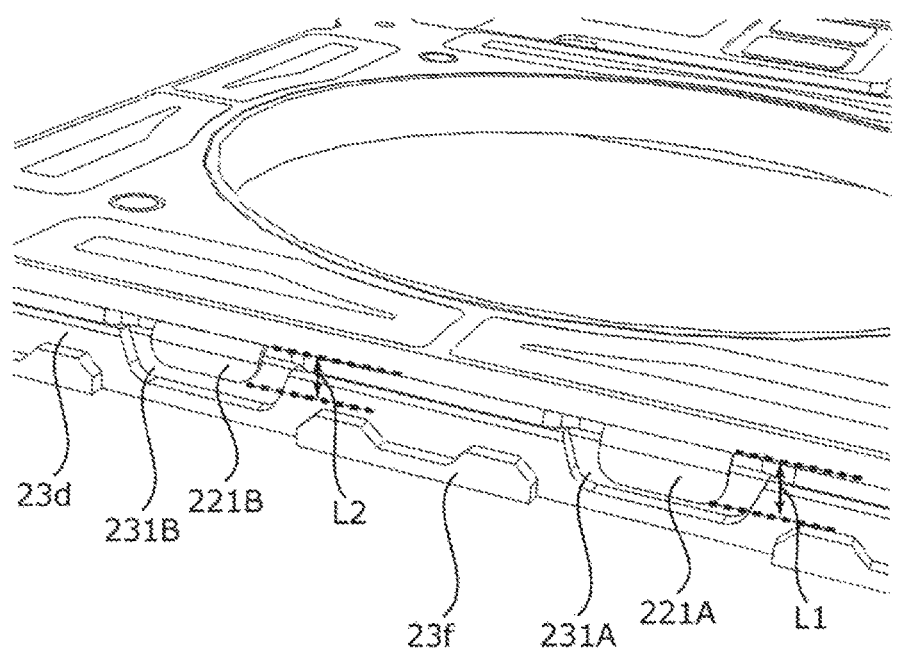
FIG. 8 is an enlarged view illustrating an attaching state of a ground terminal to a base member.

Here, ground terminal parts 221 and 222 are separated from the edges of ground terminal housing parts 231 and 232, that is, side surface 23d of base member 23. FIG. 8 illustrates an attaching state of ground terminal part 221 to base member 23. As illustrated in FIG. 8, protruding length L1 of first ground terminal 221A to base member 23 and protruding length L2 of second ground terminal 221B to base member 23 are different from each other.

When the attachment position of sensor substrate 22 is shifted as a whole to the base end side in the Y direction (ground terminal housing part 232 side of base member 23) with an attaching tolerance, protruding length L1 of first ground terminal 221A to first ground terminal housing part 231A (see FIG. 8) and protruding length L2 of second ground terminal 221B to second ground terminal housing part 231B (see FIG. 8) decrease. In this case, the contact area between second ground terminal 221B and shield cover 2 decreases. Consequently, the conduction state between second ground terminal 221B and shield cover 2 is easily impaired. On the other hand, the contact area between first ground terminal 221A and shield cover 2 is sufficiently ensured although the contact area decreases. Accordingly, a favorable conduction state between first ground terminal 221A and shield cover 2 is ensured.

In addition, when the attachment position of sensor substrate 22 is shifted as a whole to the front end side in the Y direction (ground terminal housing part 231 side of base member 23) with an attaching tolerance, protruding length L1 of first ground terminal 221A to first ground terminal housing part 231A and protruding length L2 of second ground terminal 221B to second ground terminal housing part 231B increase. In this case, the end of first ground terminal 221A is close to the edge of first ground terminal housing part 231A (that is, side surface 23d), and the adhesive agent may possibly enter the portion between first ground terminal 221A and shield cover 2, thus causing partial insulation. Consequently, the conduction state between first ground terminal 221A and shield cover 2 is easily impaired. On the other hand, the end of second ground terminal 221B is sufficiently separated from the edge of second ground terminal housing part 231B even when protruding length L2 increases. Accordingly, the possibility of entrance of the adhesive agent to the portion between second ground terminal 231B and shield cover 2 is low, and a favorable conduction state between second ground terminal 221B and shield cover 2 is ensured.

As described above, even when the protruding length of the ground terminal is changed with an attaching tolerance and the conduction state between one of the ground terminals (for example, first ground terminal 221A) and shield cover 2 can be easily impaired, the conduction state between the other ground terminal (for example, second ground terminal 221B) and shield cover 2 is ensured. Accordingly, lens driving device 1 has high reliability and is resistant to drop impact and the like.

The same applies to the conduction state between third ground terminal 222A and shield cover 2, and the conduction state between fourth ground terminal 222B and shield cover 2. In this manner, with a plurality of ground terminals having different lengths (first ground terminal 221A and second ground terminal 221B, and third ground terminal 222A and fourth ground terminal 222B) disposed at the opposite two sides of the peripheral portion, the reliability of lens driving device 1 can be further increased.

At the time of assembling lens driving device 1, one end (upper end) of suspension wire 30 is inserted to wire connecting part 131e of upper leaf springs 13A and 13B and is fixed by soldering. In this manner, suspension wire 30 and upper leaf springs 13A and 13B are electrically connected to each other.

In addition, the other end (lower end) of suspension wire 30 is inserted to wire fixing hole 21b of coil substrate 21 and is fixed by soldering. In this manner, suspension wire 30 and the power-source line of sensor substrate 22 are electrically connected to each other. Through suspension wire 30 and upper leaf springs 13A and 13B, power can be fed to AF coil part 112.

In addition, a damper (not illustrated) is disposed at damper installation part 121d (including upper portion of wire insertion part 121a) of magnet holder 121 in such a manner as to surround suspension wire 30. Thus the damper is interposed between magnet holder 121 and upper leaf springs 13A and 13B. By interposing the damper (not illustrated) between magnet holder 121 and upper leaf springs 13A and 13B, generation of unnecessary resonance (high-order resonance mode) can be reduced, and consequently, the stability of the operation can be ensured. The damper can be readily applied to damper installation part 121i by use of a dispenser. For example, ultraviolet curing silicone gel can be adopted as the damper.

Shield cover 2 is attached to lens driving device 1 such that a lower inner peripheral surface of shield cover 2 makes contact with ground terminals 221 and 222 of sensor substrate 22. To be more specific, shield cover 2 is placed to cover placing part 23f of base member 23, and adhesive agent is supplied from adhesive agent inlet 23g. By capillarity, the supplied adhesive agent fills the portion between shield cover 2 and side surface 23d of base member 23, thus bonding shield cover 2 and side surface 23d of base member 23. At this time, the advancement of the adhesive agent is blocked by the step of ground terminal housing parts 231 and 232 and side surface 23d, and therefore the adhesive agent does not flow into ground terminal housing parts 231 and 232. By adjusting the supply amount of the adhesive agent, inflow of the adhesive agent to ground terminal housing parts 231 and 232 can be readily prevented.

In lens driving device 1, when OIS coil part 211 is energized, a Lorentz force is generated at OIS coil part 211 by interaction between the magnetic field of magnet part 122 and the current flowing through OIS coil part 211 (Fleming's left hand rule). The direction of the Lorentz force is the direction (the Y direction or the X direction) orthogonal to the direction of the magnetic field (the Z direction) and to the direction of the current flowing through the long side portion of OIS coil part 211 (the X direction or the Y direction). Since OIS coil part 211 is fixed, a reactive force acts on magnet part 122. With this reactive force serving as the driving force of the OIS voice coil motor, OIS movable part 10 including magnet part 122 sways in the XY plane, and thus shake correction is performed.

In addition, in lens driving device 1, when AF coil part 112 is energized, a Lorentz force is generated at AF coil part 112 by interaction between the magnetic field of magnet part 122 and the current flowing through AF coil part 112. The direction of the Lorentz force is the direction (the Z direction) orthogonal to the direction of the magnetic field (X direction or Y direction) and the direction of the current flowing through the AF coil part 211 (the Y direction or the X direction). Since magnet part 122 is fixed, a reactive force acts on AF coil part 112. With this reactive force serving as the driving force of the AF voice coil motor, AF movable part 11 including AF coil part 112 moves in the light axis direction, and thus focusing is performed.

Here, in an non-energization state where focusing is not performed, AF movable part 11 is suspended between the infinity position and the macro position with upper leaf springs 13A and 13B and lower leaf spring 14 (hereinafter referred to as "reference state"). That is, in OIS movable part 10, AF movable part 11 (lens holder 111) is elastically supported such that AF movable part 11 is displaceable in the Z direction in the state where the position of AF movable part 11 with respect to AF fixing part 12 (magnet holder 121) is set by upper leaf springs 13A and 13B, and lower leaf spring 14.

At the time of focusing, the direction of the current is controlled based on whether AF movable part 11 is moved from the reference state to the macro position side or to the infinity position side. In addition, the value of the current is controlled based on the movement length of AF movable part 11.

As described above, lens driving device 1 includes: an OIS driving part (driving part) including a OIS movable part 10 (movable part) where a lens part (not illustrated) is disposed and OIS fixing part 20 (fixing part) where OIS movable part 10 is fixed; base member 23 having a rectangular shape in plan view, wherein shield cover 2 is attached at a peripheral portion of base member 23, and a side surface of the peripheral portion and a lower inner peripheral surface of shield cover 2 are bonded to each other with an adhesive agent; and ground terminal part 221 (first ground terminal part) disposed in base member 23 and configured to be electrically connected with shield cover 2. Base member 23 includes at a first side of the peripheral portion first ground terminal housing part 231A and second ground terminal housing part 231B recessed from the side surface. Ground terminal part 221 is integrally attached to the first side. Ground terminal part 221 includes first ground terminal 221A and second ground terminal having different lengths, first ground terminal 221A and second ground terminal being respectively disposed in first ground terminal housing part 231A and second ground terminal housing part 231B so as to be separated from the side surface.

In lens driving device 1, ground terminal part 221 integrally attached at the first side of the peripheral portion of base member 23 includes first ground terminal 221A and second ground terminal 221B having different lengths, and therefore, even when the attachment position of one of the ground terminals (for example, first ground terminal 221A) is changed to a position where the conduction state with shield cover 2 is easily impaired with an attaching tolerance, the attachment position of the other of the ground terminals (for example, second ground terminal 221B) is held at a position where the conduction state with shield cover 2 can be ensured. Accordingly, even in the case where the attachment position of the ground terminal is shifted with an attaching tolerance, the conduction state between shield cover 2 and ground terminal part 221 is ensured, and the reliability of lens driving device 1 is remarkably improved.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while the lens driving device has an AF function and an OIS function in the embodiment, the present invention is applicable to a lens driving device having an AF function or a lens driving device having an OIS function, that is, a lens driving device including a driving part (an AF driving part or an OIS driving part) that drives a lens part in which a shield cover is attached to a base member where the ground terminal is disposed.

In addition, for example, while a plurality of ground terminals having different lengths are disposed at the two sides opposite to each other in the Y direction at the peripheral portion of base member 23 in the embodiment, it suffices that a plurality of ground terminals having different lengths are integrally disposed at at least one side of the peripheral portion. In addition, while ground terminal parts 221 and 222 are integrally attached to base member 23 in the embodiment, ground terminal parts 221 and 222 may also be independently attached to base member 23.

While a smartphone serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (for example, a rear-view monitor apparatus or a drive recorder apparatus). In addition, the camera mounting device serving as a transport apparatus is a transport apparatus including a camera module and a control section that processes an image obtained with the camera module, such as an automobile.

Figure 9A:
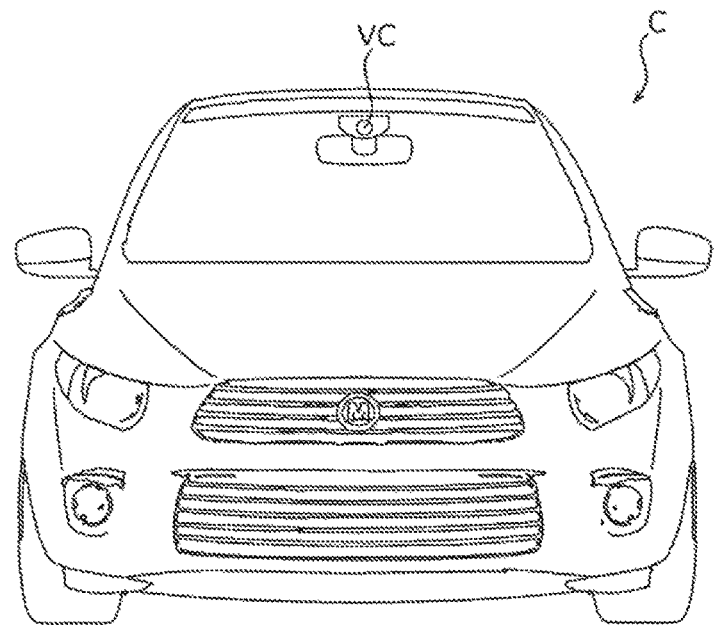
FIGS. 9A and 9B illustrate an automobile serving as a camera mounting device in which an in-vehicle camera module is mounted.
Figure 9B:
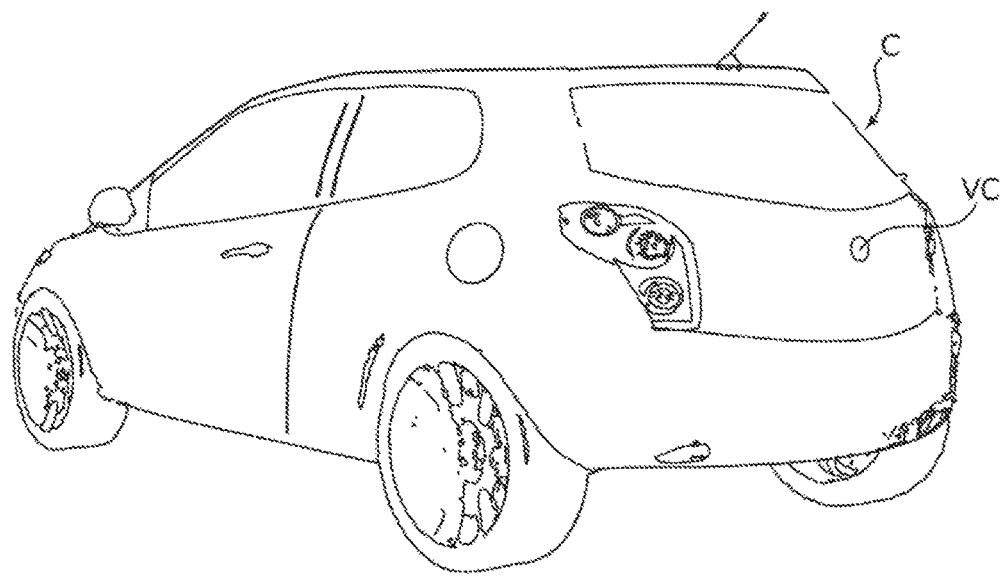

FIGS. 9A and 9B illustrate automobile C serving as a camera mounting device in which an in-vehicle camera module vehicle camera (VC) is mounted. FIG. 9A is a front view of automobile C, and FIG. 9B is a rear perspective view of automobile C. In automobile C, camera module A described in the embodiment is mounted as in-vehicle camera module VC. As illustrated in FIG. 9, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2014-265990 dated Dec.

26, 2014, the disclosure of which including the specification, drawings and abstract is incorporated herein by reference in its entirety.

REFERENCE SIGNS LIST

1 Lens driving device
2 Shield cover
10 OIS movable part (AF driving part)
11 AF movable part
111 Lens holder
112 AF coil part
12 AF fixing part
121 Magnet holder
122 Magnet part (AF magnet part, OIS magnet part)
13 Upper elastic supporting part
13A, 13B Upper leaf spring (Upper elastic supporting member)
14 Lower elastic supporting part, Lower leaf spring (Lower elastic supporting member)
20 OIS fixing part
21 Coil substrate
211 OIS coil part
211A to 211D OIS coil
22 Sensor substrate
221, 222 Ground terminal part
221A, 221B, 222A, 222B Ground terminal
23 Base member
231, 232 Ground terminal housing part (terminal housing part)
24 Position detection part
24A, 24B Hall device
30 Supporting member
M Smartphone
A Camera module

The invention claimed is:

1. A lens driving device comprising:
a driving part including a movable part comprising a lens holder and a fixing part where the movable part is fixed;
a base member having a rectangular shape in plan view, wherein a shield cover is attached at a peripheral portion of the base member, and a side surface of the peripheral portion and a lower inner peripheral surface of the shield cover are bonded to each other with an adhesive agent; and
a ground terminal part, wherein:
the base member includes at a first side of the peripheral portion a plurality of first terminal housing parts recessed from the side surface,
the ground terminal part includes a plurality of first ground terminal parts each of which is integrally attached to the first side and contacts the shield cover such that the ground terminal part and the shield cover are electrically connected, the plurality of first ground terminal parts being different from each other in length, and
each first ground terminal part disposed in a corresponding first terminal housing part of the plurality of first terminal housing parts such that a gap is formed to receive the adhesive agent between each first ground terminal part and the corresponding first terminal housing part in a direction of the length.

2. The lens driving device according to claim 1, wherein:
the base member includes at a second side opposite to the first side a plurality of second terminal housing parts recessed from the side surface;
the ground terminal part includes a plurality of second ground terminal parts each of which is integrally attached to the second side and contacts the shield cover such that the ground terminal part and the shield cover are electrically connected, the plurality of second ground terminal parts being different from each other in length; and
each second ground terminal part disposed in a corresponding second terminal housing part of the plurality of second terminal housing parts such that a gap is formed to receive the adhesive agent between each second ground terminal part and the corresponding second terminal housing part in a direction of the length.

3. The lens driving device according to claim 1, wherein the driving part includes an auto-focusing driving part including an auto-focusing coil part disposed at a periphery of the lens holder, and an auto-focusing magnet part disposed separately from the auto-focusing coil part in a radial direction, the auto-focusing driving part being configured to perform automatic focusing by moving, with respect to the fixing part including one of the auto-focusing coil part and the auto-focusing magnet part, the movable part including the other of the auto-focusing coil part and the auto-focusing magnet part in a light axis direction by use of a driving force of a voice coil motor composed of the auto-focusing coil part and the auto-focusing magnet part.

4. The lens driving device according to claim 1, wherein the driving part includes a shake-correcting driving part including a shake-correcting magnet part disposed in the movable part and a shake-correcting coil part disposed in the fixing part, the shake-correcting driving part being configured to perform shake correction by swaying the movable part with respect to the fixing part in a plane orthogonal to a light axis direction by use of a driving force of a voice coil motor composed of the shake-correcting coil part and the shake-correcting magnet part.

5. A camera module configured to capture a subject image, the camera module comprising:
the lens driving device according to claim 1; and
the shield cover.

6. A camera mounting device that is an information apparatus or a transport apparatus, the camera mounting device comprising the camera module according to claim 5.

* * * * *